United States Patent
Dombrowski et al.

(10) Patent No.: US 9,652,459 B2
(45) Date of Patent: May 16, 2017

(54) INDEPENDENT CONTENT TAGGING OF MEDIA FILES

(75) Inventors: Brian Dombrowski, San Jose, CA (US); Scott Bennett, San Jose, CA (US)

(73) Assignee: Reel Coaches, Inc., San Jose, CA (US)

( * ) Notice: Subject to any disclaimer, the term of this patent is extended or adjusted under 35 U.S.C. 154(b) by 1205 days.

(21) Appl. No.: 13/295,393

(22) Filed: Nov. 14, 2011

(65) Prior Publication Data

US 2013/0124461 A1    May 16, 2013

(51) Int. Cl.
*G06F 17/30* (2006.01)
*H04W 4/02* (2009.01)

(52) U.S. Cl.
CPC .. *G06F 17/30038* (2013.01); *G06F 17/30041* (2013.01); *G06F 17/30044* (2013.01); *H04W 4/02* (2013.01)

(58) Field of Classification Search
CPC ......... G06F 17/30038; G06F 17/30041; G06F 17/30044; H04W 4/02
See application file for complete search history.

(56) References Cited

U.S. PATENT DOCUMENTS

| | | | |
|---|---|---|---|
| 2005/0060741 A1* | 3/2005 | Tsutsui | H04N 5/445 725/32 |
| 2007/0078898 A1* | 4/2007 | Hayashi et al. | 707/104.1 |
| 2007/0239779 A1* | 10/2007 | Hugill et al. | 707/104.1 |
| 2008/0005130 A1* | 1/2008 | Logan et al. | 707/10 |
| 2009/0132583 A1* | 5/2009 | Carter | G06F 17/30056 |
| 2009/0192998 A1* | 7/2009 | Paulsen | 707/3 |
| 2012/0017150 A1* | 1/2012 | Pollack | 715/716 |
| 2012/0023099 A1* | 1/2012 | Crossley et al. | 707/736 |
| 2013/0007043 A1* | 1/2013 | Phillips | G06F 17/30038 707/769 |
| 2013/0278826 A1* | 10/2013 | Schlieski et al. | 348/515 |

* cited by examiner

*Primary Examiner* — Shew-Fen Lin
(74) *Attorney, Agent, or Firm* — Inventive Patent Law P.C.; Jim H. Salter

(57) ABSTRACT

Methods for generating meta-tagged media files, in which features of an event recorded in the media file are tagged to identify content, are disclosed herein. The methods include independent and simultaneous generation of a media file and meta-tags, and the combination of the media file and the meta tags based on a correlation of device times to generate the meta-tagged media file.

33 Claims, 9 Drawing Sheets

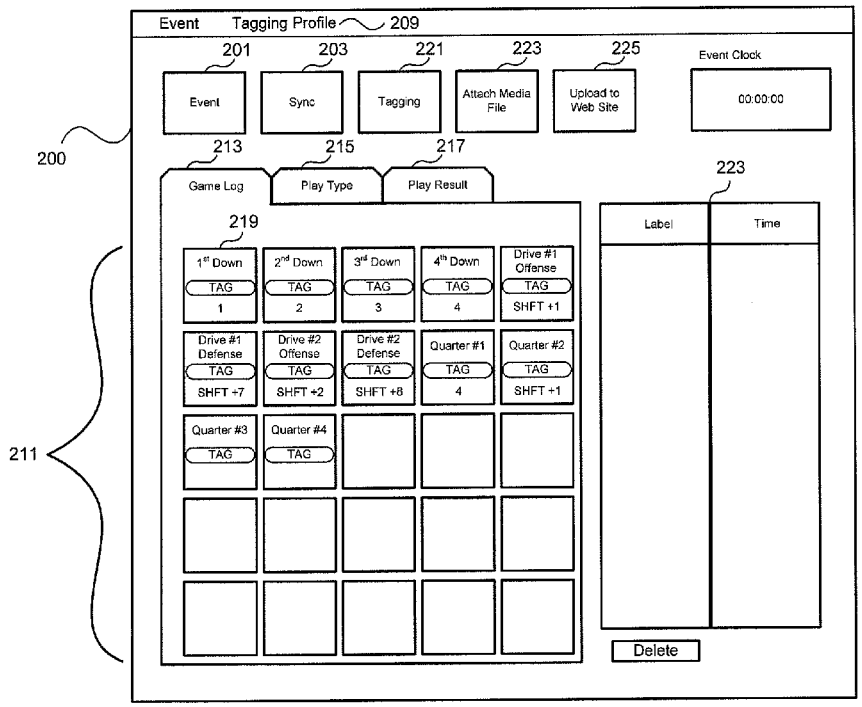
FIG. 2A
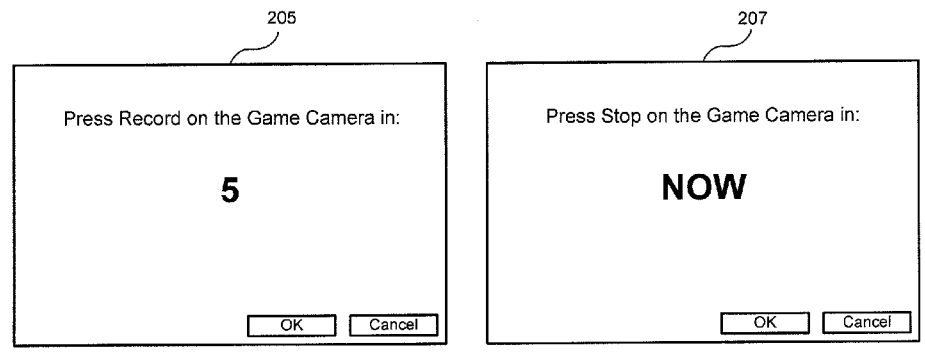
FIG. 2B  FIG. 2C

INDEPENDENT CONTENT TAGGING OF MEDIA FILES

FIELD OF THE INVENTION

The invention resides in the field of digital media generation, and in particular in the generation of meta-tagged media files via independent content tagging of live events.

BACKGROUND OF THE INVENTION

Breaking down and viewing game film has become a virtually indispensible component of coaching and performance evaluation in many individual and team sports. With the advent of digital video and meta-tags, it has become possible to archive, sort, and view videos or portions of videos based on the descriptive information contained in the meta-tags.

However, the generation of meta-tags and the data they contain is generally a time-consuming and laborious endeavor. Often, coaching staff or other personnel associated with a team or sports organization must spend hours going through a pre-recorded video stream of a sporting event and inserting meta-tags at locations within the video that may be of interest to coaches and/or participants. Although techniques for real-time generation of meta-tags associated with a video stream are also available, which can eliminate the time-consuming post-production tagging process, these techniques require a physical and often cumbersome connection (e.g., a fire-wire cable) between the video camera and the computer on which the meta-tags are being generated.

SUMMARY OF THE INVENTION

In one aspect, the present invention provides a method for producing a meta-tagged media file. In one embodiment, the method comprises: (a) correlating device time of a media-file generator with device time of a meta-tag generator; (b) recording an event to produce a media file in the media-file generator; (c) independently and simultaneously with the recording, generating at least one meta-tag with the meta-tag generator, wherein the meta-tag corresponds to a feature of the event; and (d) combining the media file and the at least one meta-tag to produce the meta-tagged media file, wherein the meta-tag is associated with the feature of the event recorded in the media file. In some cases, correlating device time of the media-file generator with device time of the meta-tag generator comprises synchronizing the media-file generator and the meta-tag generator. In some cases, the synchronizing occurs prior to recording the event. In one embodiment, synchronizing the meta-tag generator and the media-file generator is performed by (a) beginning recordation of a sync-clip on the media file generator, and (b) ending recordation of the sync-clip on the media file generator, wherein the beginning and/or ending of the sync-clip coincides with generation of a sync-tag on the meta-tag generator.

In some cases, the media file is a video file. In other cases, the media file is an audio file. In still other cases, the media file comprises both audio and video. Reference to a video file herein does not exclude the presence of audio unless otherwise indicated.

In some embodiments of the present invention, the media-file generator is a digital camcorder. The media-file generator can be any device capable of capturing digital audio and/or video of an event. In some cases, the media-file generator comprises two or more media-file generators. In some embodiments, a plurality of media-file generators may be used, including two, three, four, five, six, seven, eight, nine, ten, or more media-file generators.

In some embodiments, the meta-tag generator is selected from the group consisting of a computer, a laptop computer, a mobile device, a tablet computer, and a smart phone. In some cases, the meta-tag generator comprises two or more meta-tag generators. In some embodiments, a plurality of meta-tag generators may be used, including two, three, four, five, six, seven, eight, nine, ten, or more meta-tag generators.

In some cases, the media file is stored on a removable storage device in the media-file generator when it is produced. In one embodiment, the removable storage device is a secure digital (SD) card. The SD card can be a standard capacity, high capacity, or extended capacity card. Other types of digital storage media or devices will be familiar to the skilled artisan and are included within the meaning of removable storage device herein.

In some embodiments of the present invention, the event is a sporting event. In some cases, the sporting event is selected from the group consisting of a football game, a basketball game, a golf tournament, a tennis match, a water polo match, a volleyball game, a soccer game, a baseball game, a softball game, a gymnastics meet, a wrestling meet, a track meet, a cross-country meet, a lacrosse game, a hockey game, a field hockey game, a roller hockey game, a badminton match and a rugby match.

In another aspect, the present invention provides a method for producing a meta-tagged media file, in which the method comprises: (a) synchronizing a media-file generator and an event device; (b) recording an event to produce a media file in the media-file generator; (c) independently and simultaneously with the recording, generating at least one meta-tag with a meta-tag generator, wherein the meta-tag corresponds to a feature of the event; and (d) combining the media file and the at least one meta-tag to produce the meta-tagged media file, wherein the meta-tag is associated with the feature of the event recorded in the media file. In some cases, the synchronizing occurs prior to recording the event.

In some embodiments, the event device is the meta-tag generator. In other embodiments, the event device is not the meta-tag generator, and the method further comprises a step of correlating device time of the meta-tag generator with device time of the media-file generator prior to combining the media file and the at least one meta-tag.

In some cases, the event device is selected from a computer or a laptop computer.

In yet another aspect, the present invention provides a method of synchronizing a meta-tag generator and a media-file generator. In one embodiment, the method comprises: (a) beginning recordation of a sync-clip on the media file generator; and (b) ending recordation of the sync-clip on the media file generator, wherein the beginning and/or ending of the sync-clip coincides with generation of a sync-tag on the meta-tag generator. In one embodiment, the meta-tag generator is a computer, and the media-file generator is a digital camcorder.

In some embodiments, a user is prompted to begin and end recordation of the sync-clip. In some cases, the prompt comprises a timed countdown culminating in generation of the sync-tag. In some embodiments, the prompt is generated by the meta-tag generator.

In still a further aspect, the present invention provides an electronically accessible site (e.g., a web page or group of web pages) via which users can search and/or view meta-tagged media files prepared in accordance with the methods of the present invention.

The details of additional embodiments of the invention are set forth in the description below. Any or all of the features discussed above and throughout the application can be combined in various embodiments of the present invention. Other features and advantages of the invention will be apparent from the detailed description and the accompanying drawings, and from the claims.

BRIEF DESCRIPTION OF THE DRAWINGS

FIGS. 2A-2E are illustrations of an exemplary graphical user interface for use in performing the method illustrated in FIG. 1 in accordance with an embodiment of the invention.

DETAILED DESCRIPTION OF THE INVENTION

I. Definitions

Figure 1:
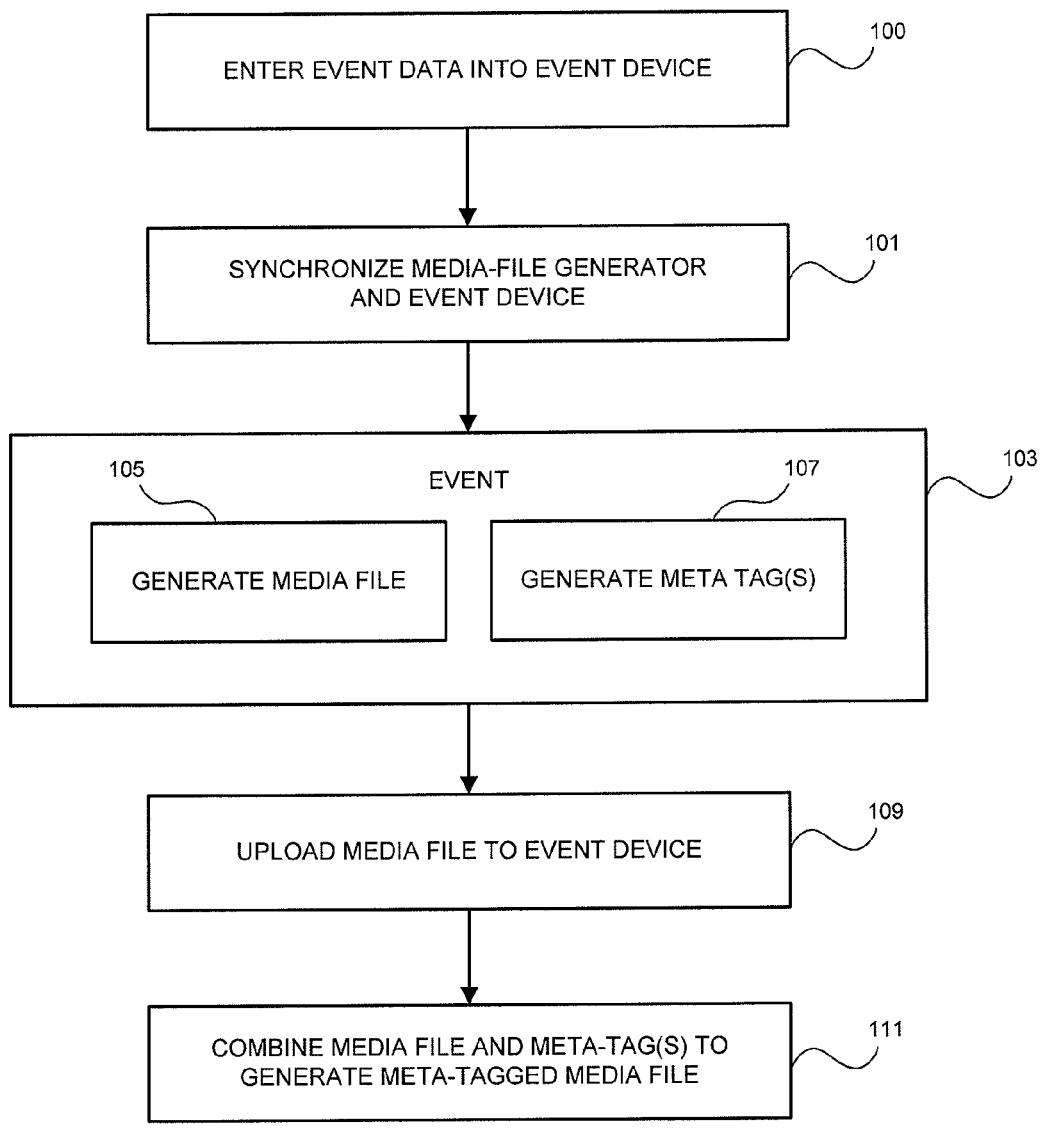
FIG. 1 is a flow diagram illustrating an exemplary flow of events in a process for generating a meta-tagged media file in accordance with an embodiment of the present invention.

As used herein, the term "Device time" refers, unless otherwise indicated, to an internal time maintained by an electronic device, for example and without limitation, a computer, a laptop computer, a mobile device, a tablet computer, a smart phone, or any other electronic device used in accordance with the teachings of the present invention.

As used herein, the term "Event" refers, unless otherwise indicated, to a live event, including, for example and without limitation, a sporting event, a presentation, a demonstration, a performance, a speech, a lecture, or the like.

As used herein, the term "Event device" refers, unless otherwise indicated, to an electronic device capable of maintaining device time, and capable of executing a set of machine readable instructions to allow a user to enter data corresponding to an event, to prompt a user to generate a sync-clip, and to generate a sync-tag corresponding to a portion of the sync-clip. For example, and without limitation, an "event device" can be a computer or a laptop computer.

As used herein, the term "Feature" refers, unless otherwise indicated, to an aspect of an event, for example and without limitation, a period of play, a particular play or a particular play result during a sporting event.

As used herein, the terms "Independent" or "Independently" refer, unless otherwise indicated, to an absence of any physical connection. For example, in the context of independent media file and meta-tag generation in accordance with the present invention, the media-file generator and the meta-tag generator have no physical connection that would permit data transmission between the two devices while the media file and the meta-tags are being generated.

As used herein, the term "Media file" refers, unless otherwise indicated, to an audio, video, or audio/video file.

As used herein, the term "Media-file generator" refers, unless otherwise indicated, to an electronic device capable of maintaining device time, and capable of recording audio and/or video of an event. For example, and without limitation, a "media-file generator" can be a digital camcorder, a digital video camera, or the like.

As used herein, the term "Meta-tag" refers, unless otherwise indicated, to a machine-readable file comprising descriptive information about a feature of an event and a time-stamp.

As used herein, the term "Meta-tag generator" refers, unless otherwise indicated, to an electronic device capable of maintaining device time, and capable of executing a set of machine readable instructions to allow a user to generate meta-tags corresponding to features of an event. For example, and without limitation, a "meta-tag generator" can be a computer, a laptop computer, a mobile device, a tablet computer, or a smart phone.

As used herein, the term "Removable storage device" refers, unless otherwise indicated, to a machine readable storage medium that can be readily inserted and removed from an electronic device. For example, and without limitation, a "removable storage device" can be an SD card.

As used herein, the term "Simultaneously" refers, unless otherwise indicated, to the occurrence of two or more actions at the same, or at substantially the same, time. For example, in the context of simultaneous media file and meta-tag generation in accordance with the present invention, the media file and the meta tags are generated during an event, and the meta-tags are generated simultaneously with the generation of at least a portion of the media file.

As used herein, the term "Sync clip" refers, unless otherwise indicated, to a short (e.g., 5 seconds) media clip recorded on a media-file generator.

As used herein, the term "Sync tag" refers, unless otherwise indicated, to a meta-tag comprising a time-stamp corresponding to the beginning and/or end of a sync-clip.

As used herein, the term "Synchronizing" refers, unless otherwise indicated, to the co-generation of time-stamps in two or more devices such that the co-generated time-stamps are identifiable to permit correlation of device time between the two or more devices.

Embodiments of methods for generating meta-tagged media files are described in detail herein. In the following description, numerous specific details are provided, such as the identification of various system components, to provide a thorough understanding of embodiments of the invention. One skilled in the art will recognize, however, that the invention can be practiced without one or more of the specific details, or with other methods, components, materials, etc. In still other instances, well-known components or operations are not shown or described in detail to avoid obscuring aspects of various embodiments of the present invention.

Reference throughout this specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout this specification are not necessarily all referring to the same embodiment. Furthermore, the particular features, structures, or characteristics may be combined in any suitable manner in one or more embodiments.

II. General

As an overview, the present invention relates to methods for producing a meta-tagged media file of an event (e.g., a video of a live sporting event) in which particular features of the event (e.g., periods of play or particular types of plays, including for example scoring plays) are associated with descriptive meta-tags to permit the features to be readily archived, searched, and/or located within the media file after conclusion of the event. The methods of the present invention are based, in part, on the correlation of time between the device or devices used to generate one or more media files (e.g., a digital camcorder) and the device or devices used to independently generate one or more meta-tags (e.g., a laptop computer) such that the media file and the meta-tags can be combined upon conclusion of the event to create a meta-tagged media file in which the meta-tags are properly associated with the corresponding portions of the media file.

As will be appreciated, each electronic device contemplated for use in the methods of the present invention (e.g., digital camcorders, laptop computers, tablet computers, smart phones, servers, and the like) has an internal clock which maintains device time that can be associated with each media clip or file and each meta-tag generated by the respective device. Correlation of these device times permits the generation of meta-tags during the course of the live event on one or more devices that are physically distinct from the device (or devices) used to generate the media file, thereby eliminating any requirement that the devices be interconnected (e.g., by a fire-wire cable) in order to produce a meta-tagged media file during the live event. The real-time generation of meta-tags also eliminates the often time consuming process of adding meta-tags to a prerecorded media file.

In some cases, correlating the device times of two or more devices can be accomplished by synchronizing the devices via co-generation of time-stamps on each device. The co-generated time-stamps are identifiable and can be used to correlate the respective device times associated with each media file or segment thereof, and each meta-tag that corresponds to a feature of an event recorded in the media file.

In order to practice the methods of the present invention the correlated device times need not correspond precisely. In some cases, the correlated device times may differ by, e.g. as much as one or two seconds or more without detracting from the ability to properly associate meta-tags with their corresponding features in the media file. In a preferred embodiment, the correlated device times differ by no more than one second. In a more preferred embodiment, the correlated device times differ by less than one second (e.g., no more than 10 s or 100 s of milliseconds). Reference to a difference in this context between correlated device times means that when a meta-tagged media file is produced, the meta-tag will correspond to the feature of the event recorded in the media-file to within, e.g., one second of the time at which that feature occurs in the media-file. For example, if a feature (e.g., a scoring play of a sporting event) begins at time X in a recorded media-file, the meta-tag generated for that feature preferably corresponds to a time of X±1 second when the device times are correlated to produce the meta-tagged media file. It will be appreciated that the actual device times (i.e., the internal clocks of the devices) may not correspond to one another as precisely as the correlated device times.

These and other advantages of the present invention will be apparent to the reader from the foregoing, and as the detailed description and discussion is read in conjunction with the accompanying drawings.

III. Generation of Meta-Tagged Media Files

With reference now to the drawings, and in particular to FIG. 1, there is illustrated a flow diagram of one embodiment of a method for generating a meta-tagged media file in accordance with the teachings of the present invention. In the illustrated embodiment, the method comprises, (a) entering event data into an event device 100, (b) synchronizing a media-file generator and the event device 101, (c) simultaneously and independently generating a media file 105 and meta-tags 107 during a live event 103, (d) uploading the media file to the event device 109, and (e) combining the media file and the meta-tags to generate a meta-tagged media file. In a preferred embodiment of the method illustrated in FIG. 1, the media-file generator is a digital camcorder that is used to record video of a live event (e.g., a sporting event), and the event device is a laptop computer, which, in one embodiment, is also used to generate the meta-tags, which correspond to features (e.g., plays) of the live event.

Although the methods of the present invention can be used in connection with the audio and/or video recordings of any live event, the methods are preferably used in connection with sporting events in which features of the event, for example, periods of play (e.g., $1^{st}$ quarter, $2^{nd}$ quarter, etc.), offensive and defensive sequences, scoring plays (e.g., touchdowns, goals, etc.), and the performance of individual players (e.g., John Doe) are of particular interest to coaches, participants and/or fans of the players, teams, or sport. In various embodiments, the sporting event may be a football game, a basketball game, a golf tournament, a tennis match, a water polo match, a volleyball game, a soccer game, a baseball game, a softball game, a gymnastics meet, a wrestling meet, a track and field meet, a cross-country meet, a lacrosse game, a hockey game, a field hockey game, a roller hockey game, a badminton match, or a rugby match.

Other events for which the methods of the present invention are useful include live presentations, demonstrations, performances, speeches, lectures, or other live events. Although the following discussion largely pertains to embodiments illustrating the methods of the present invention in the context of sporting events, the reader will understand that the same or similar techniques can be applied to other types of live events.

A. Entering Event Data

Figure 2D:
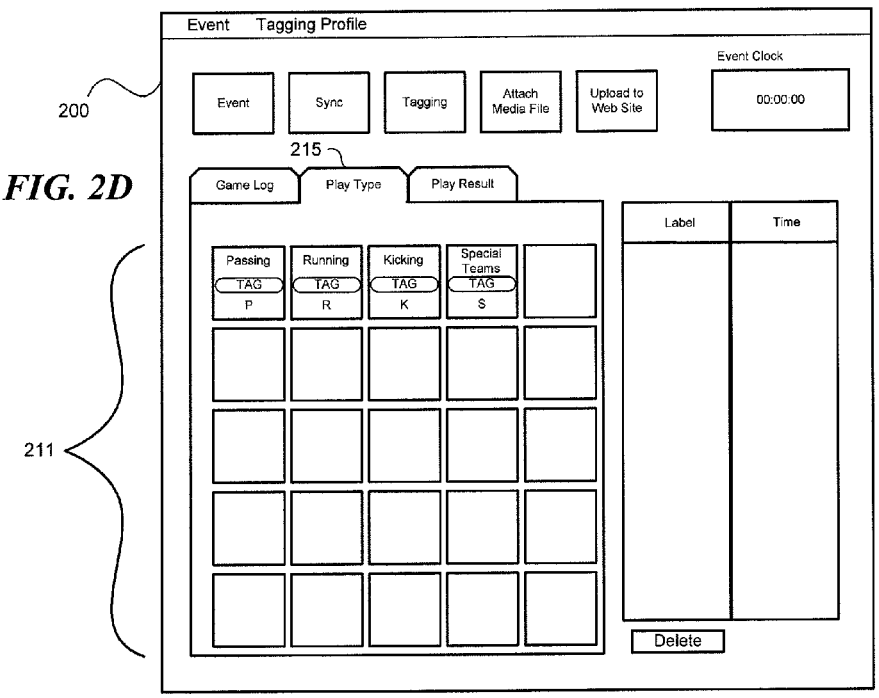

In one embodiment of the method illustrated in FIG. 1, a user can perform portions of the method using software executed on the event device, for which an exemplary graphical user interface (GUI) 200 is shown in FIG. 2A. With reference now primarily to FIGS. 2A-2E, in one embodiment a user may select "New Event" 201 on the GUI, which may open a dialog box with fields that allow the user to enter event specific information, e.g., a name for the event, the date the event is taking place, and the teams participating in the event. Although the event data may be entered prior to the event, the event data may also be entered at another time, e.g., following completion of the event.

B. Synchronization of Media-File Generator and Event Device

In one embodiment, after creating a new event, the user may select "Sync" 203 on the GUI to synchronize the media-file generator and the event device. As discussed above, the present invention is based, in part, on the correlation of time between devices used to generate the media file and the meta-tags. In one embodiment, this correlation can be accomplished by synchronizing the media-file generator and the event device, which, in some cases, is also used to generate the meta-tags. For example, synchronizing the media-file generator and the event device may include recording a sync-clip on the media-file generator, and creating a corresponding sync-tag on the event device to correspond to the beginning and/or ending of the sync-clip. In some cases, synchronization of the media-file generator and the event device can be done before generation of the media file and the meta-tags. In other cases, synchronization can be done after generation of the media file and the meta-tags.

In one embodiment, selection of "Sync" 203 by the user may open a dialog box that prompts the user to confirm that the media-file generator (e.g., a digital camcorder) is turned on and a removable storage device (e.g., an SD card) has been inserted into the media-file generator and correctly formatted to enable generation of the media file on the storage device. The user may confirm completion of these tasks by, for example, selecting "Next" or "OK" on the dialog box, which in turn may open a series of further dialog boxes which prompt the user to begin and stop recording the sync-clip on the media-file generator. For example, a dialog box 205 may appear prompting the user to begin recording the sync-clip on the media-file generator in, e.g., 5 seconds. The user may watch the countdown in the dialog box and press "Record" on the media-file generator as prompted by the dialog box. Then, in one embodiment, a second dialog box 207 may appear prompting the user to stop recording the sync-clip on the media-file generator in, e.g., 5 seconds. Again, the user may watch the countdown in the dialog box until the dialog box displays "NOW" and again press "Record" on the media-file generator to stop recording the sync-clip. In one embodiment, the prompts for the user to begin and stop recording the sync-clip (e.g., the moment the prompt dialog box displays "NOW") correspond to the generation of one or more sync-tags in the event device. For example, a sync-tag may be generated at the prompt to stop recording the sync-clip. In this example, the end of the sync-clip and its associated device time (e.g., the internal time on the digital camcorder) will correspond to the event device time (e.g., the internal time on the laptop computer) associated with the sync-tag. Thus, upon conclusion of the event, the media file and its associated device times, and the meta-tags and their associate device times can be correlated based on the known relationship between the end of the sync-clip and the sync-tag.

C. Generation of Media File and Meta-Tags

Figure 2E:
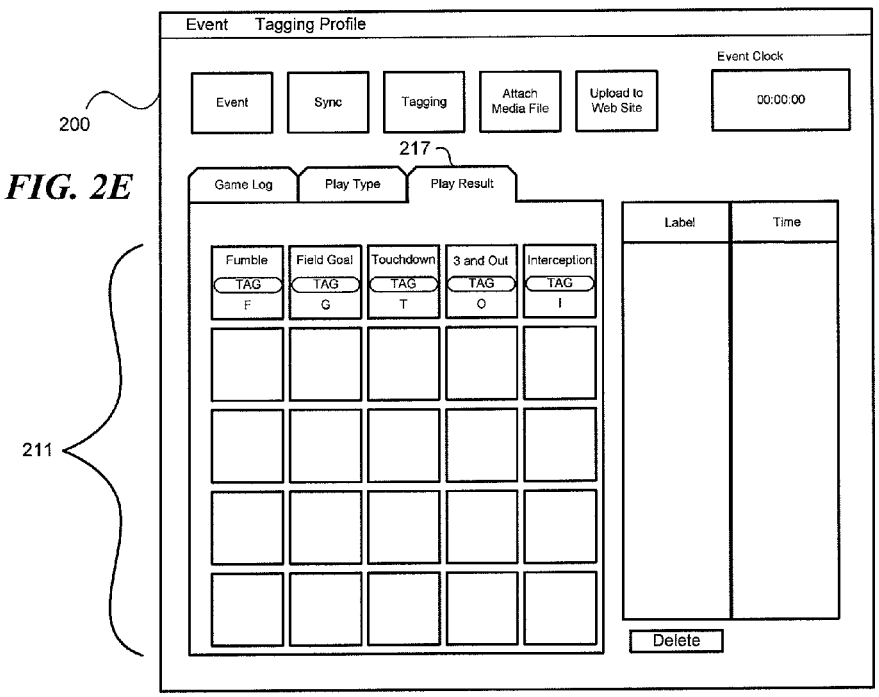

In accordance with the present invention, the media file corresponding to the event and the meta-tags corresponding to features of the event are generated simultaneously, but independently during the course of the event. In one embodiment, a user may select a "Tagging Profile" 209 from, e.g., a drop-down menu in the GUI on the event device. In some cases, the tagging profile may permit the user to select from among a list of specific types of events, for example, different types of sporting events, so that a number of commonly used tags corresponding to that type of event are made available to the user. For example, if the user selects a tagging profile corresponding to a football game, a number of tags corresponding to particular features of a football game may be automatically populated into a tag matrix for use during the course of the event. As illustrated in FIGS. 2A, 2D and 2E, a tag matrix 211 may comprise an array of tags corresponding to, e.g., different features of the game (tab 213), different types of plays (tab 215), and different play results (tab 217). For example, a particular tag 219 may correspond to a "1st Down" play and may be associated with a hot key (e.g., the number 1) on the event device keyboard (or the keyboard or touch screen of another meta-tag generator, as will be discussed in greater detail below) to permit a meta-tag corresponding to that feature of the event to be readily generated. In some cases, the user may also create their own tags unique to their particular objectives or the players participating in the sporting event.

To begin generating meta-tags corresponding to the event, a user may select "Tagging" 221 on the GUI, in an embodiment. During the course of the live event, the user may then select the appropriate tags from the tag matrix or use the appropriate hot keys corresponding to the tags in the tag matrix to generate one or more meta-tags corresponding to particular features of the event. Each meta-tag comprises user-defined descriptive information (e.g., $1^{st}$ Down) as well as a time-stamp generated by the meta-tag generator at the time the meta-tag is generated.

Figure 3A:
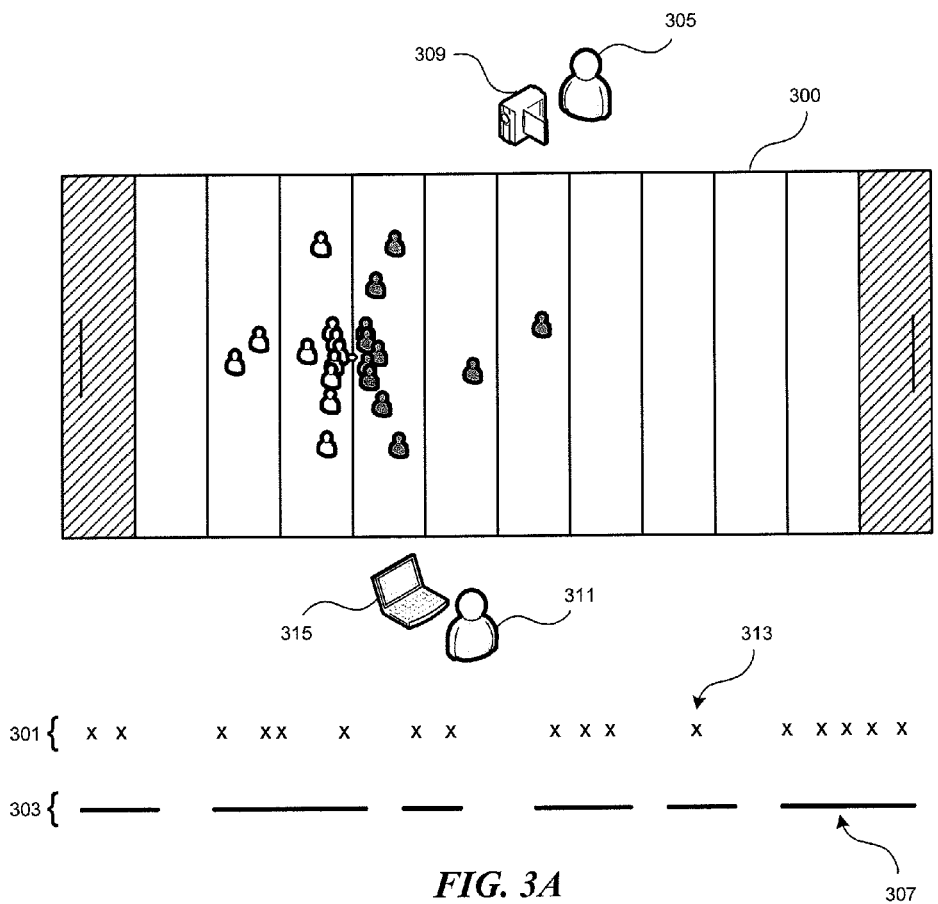
FIG. 3A is an illustration showing an exemplary event (e.g., a football game) at which a media file (e.g. a video) of the event and meta-tags corresponding to features of the event are independently and simultaneously generated in accordance with an embodiment of the invention.

With reference now primarily to FIG. 3A, the generation of a series of meta-tags 301 and a media file 303 for a football game 300 is illustrated as an example of how the meta-tags and the media file are independently generated during the course of a live event. In the illustrated embodiment of FIG. 3A, a videographer 305 records a series of video segments 307 on a digital camcorder 309, while a user 311 independently and simultaneously generates individual meta-tags 313 corresponding to features of the football game on a laptop computer 315. As will be appreciated, the media file (e.g., the game video) may include the entire game or may include only a series of video segments as shown in FIG. 3A, which may, for example, exclude those portions of the game in which no relevant activity is occurring (e.g., time-outs, time between periods of play, etc.). In one embodiment, the meta-tags and their corresponding device times may be displayed in a window 223 on the event device, which may permit a user to delete particular tags, if desired.

In some embodiments, it may be desirable to include a time-offset in connection with some types of meta-tags based on pre-determined considerations, or as specified by a user when establishing a particular tagging profile, such that the meta-tags are associated with an earlier or later point in the media file when the meta-tagged media file is generated than would otherwise occur based on the time correlation between the media-file generator and the meta-tag generator. For example, during the course of an event (e.g. a football game), a user may generate a meta-tag corresponding to a particular feature (e.g., a touchdown) that corresponds to a segment of the media file that precedes the time at which the meta-tag is generated. In this case, it would be desirable to place the meta-tag at or near the beginning of the segment that corresponds to the particular feature. For instance, if the meta-tag corresponds to a touchdown in a football game, a viewer watching the meta-tagged video after the game may be interested in seeing the entire play that corresponds to the touchdown. If the meta-tag corresponding to the touchdown is offset by, e.g., 10 seconds, such that in the final meta-tagged media file the particular meta-tag corresponds to a point in the media file that is 10 seconds prior to the touchdown, the viewer will be able to see the entire play which led to the touchdown.

In one embodiment, a user may manually modify the time-offset of any particular meta-tag during or after the event. As will be appreciated, the time-offset may be any appropriate time period (e.g., 1, 2, 3, 4, 5, 10, 20, 30 or more seconds) that results in placement of the meta-tag in the appropriately corresponding position in the media file when the media file and the meta-tag are combined.

D. Combining Meta-Tags with Media Files

Figure 3B:
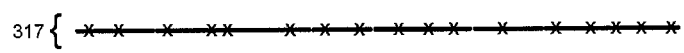
FIG. 3B is an illustration of a meta-tagged media file generated from the meta-tags and the independent media file shown in FIG. 3A.

Upon completion of the event, a user may select "Attach Media File" 223 (shown in FIG. 2A), and upload the media file and the corresponding sync-clip from the media file generator to the event device, in an embodiment. For example, the media file and the corresponding sync-clip may be stored on a removable storage device, such as an SD card in the media-file generator. In this situation, the user can remove the storage device and insert it into a port on the event device to upload the media file and the sync-clip. Using the time correlation between the sync-clip uploaded from the media-file generator, and the sync-tag generated in the event device, the series of meta-tags 301 (see FIG. 3A) and the media file 303 (see FIG. 3A) can be combined to generate a meta-tagged media file 317 (see FIG. 3B) in which the meta-tags are associated with the corresponding features of the event at the appropriate points within the media file, which in one embodiment, comprises a contiguous video file compiled from the series of video segments 307 (see FIG. 3A) recorded during the course of the event.

In one embodiment, the content data corresponding to an event and the meta-tags corresponding to features of the event are contained within an XML file in which each meta-tag includes descriptive information regarding the corresponding feature of the event it is intended to identify, and a time-stamp corresponding to the device time in the meta-tag generator which was used to generate the meta-tag. Optionally, the XML file also includes a time-offset associated with the meta-tag.

In one embodiment, the meta-tagged media file can then be uploaded to a web site or server by a user for archiving and viewing by interested parties, as discussed more fully below. In one embodiment, a user may select "Upload to Web Site" 225 in the GUI on the event device, which, when connected to an appropriate network, will enable the meta-tagged media file to be uploaded to a server and subsequently made available for searching (e.g., via meta-tags), viewing, and/or for manipulating to make highlight video clips and the like.

E. Multiple Meta-Tag Generators

Figure 4:
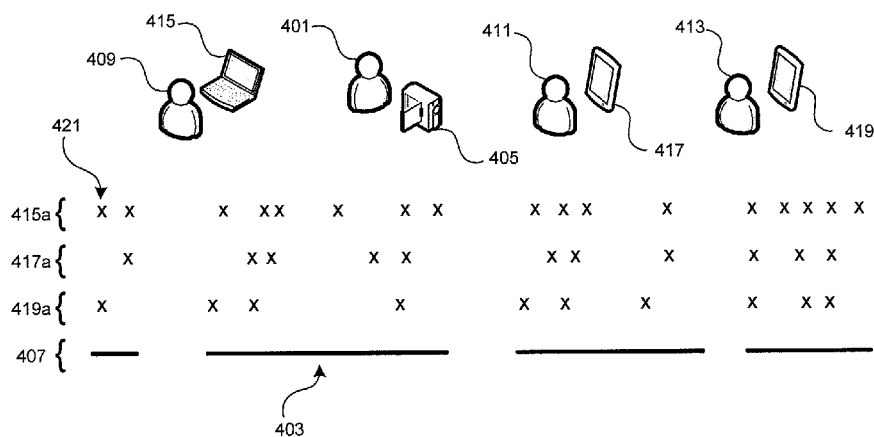
FIG. 4 is an illustration showing an embodiment in which a plurality of meta-tag generators (e.g., laptops or mobile devices) are used in conjunction with a single media-file generator (e.g., a digital camcorder) to generate a single media file (e.g., a video) of an event and a plurality of meta-tag files comprising meta-tags corresponding to features of the event in accordance with an embodiment of the invention.

In some cases, the methods of the present invention include the use of multiple meta-tag generators operated independently during the course of an event. With reference now to FIG. 4, an embodiment of a scenario is illustrated in which multiple meta-tag generators are used in conjunction with a single media-file generator. In the illustrated embodiment, a videographer 401 records segments 403 of an event with a digital camcorder 405 to produce a media file 407. Independently and simultaneously, three different users 409, 411 and 413, generate three different sets of meta-tags 415a, 417a and 419a using a laptop computer 415 and a pair of mobile devices 417 and 419, respectively. As discussed above, each individual meta-tag 421 corresponds to a feature of the event.

Depending on the number of meta-tags that are desired in connection with any particular event, it may be advantageous to have individual users be responsible for the generation of different types of meta-tags. For example, in a sporting event such as a football game, one user may generate meta-tags corresponding to defensive sequences and a second user may generate meta-tags corresponding to offensive sequences, or the like, while still a third user generates meta-tags of particular interest to the coaching staff, individual players, or the like. At the conclusion of the event, the meta-tag sets 415a, 417a and 419a from each of the respective meta-tag generators 415, 417 and 419 can be combined with the media file 407 to generate the meta-tagged media file, as discussed above. In those instances such as that shown in FIG. 4, in which a device or devices other than the event device is/are used to generate meta-tags, the device time corresponding to each of the meta-tags can be correlated with the device time of the corresponding media file by correlating the event device time (e.g., the laptop computer time) with the device time of the other meta-tag generator(s) (e.g., mobile devices) at the time the meta-tags are uploaded to the event device. This type of correlation is discussed in greater detail below in connection with FIG. 7.

F. Multiple Media-File Generators

Figure 5:
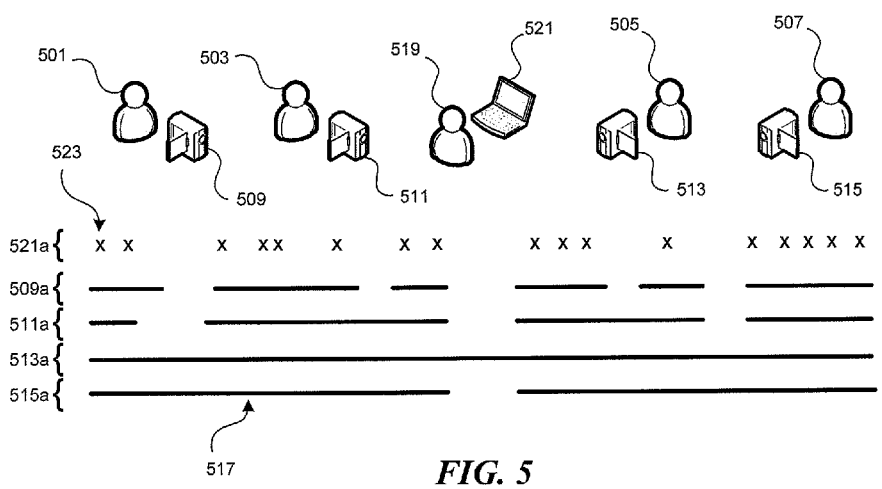
FIG. 5 is an illustration showing an embodiment in which a plurality of media-file generators (e.g., digital camcorders) are used in conjunction with a single meta-tag generator (e.g., a laptop) to generate a plurality of media files (e.g., videos) of an event and a single meta-tag file comprising meta tags corresponding to features of the event in accordance with an embodiment of the invention.

In some cases, the methods of the present invention include the use of multiple media-file generators operated independently during the course of an event. With reference now to FIG. 5, an embodiment of a scenario is illustrated in which multiple media-file generators are used in conjunction with a single meta-tag generator. In the illustrated embodiment, videographers 501, 503, 505 and 507 independently record segments 517 of an event with digital camcorders 509, 511, 513 and 515 to produce media files 509a, 511a, 513a and 515a, respectively. Independently and simultaneously, a user 519 generates a set of meta-tags 521a using a laptop computer 521. As discussed above, each individual meta-tag 523 corresponds to a feature of the event.

In some cases, it may be advantageous or desirable to generate multiple media files of the same event. For example, in the embodiment illustrated in FIG. 5, each of the four digital camcorders can be recording the event from different locations so that each media file comprises a different view or angle of the event. In the context of sporting events, the availability of different angles or views of any particular play may be of particular interest to the coaching staff, players and/or fans. When multiple media-file generators are used, each can be synced with an event device (e.g., a laptop computer) by generating a sync-clip and a corresponding sync-tag as discussed above to permit correlation of device times between the various media-file generators and the meta-tag generator. In the illustrated embodiment, the set of meta-tags 521*a* can be correlated to each of the respective media files 509*a*, 511*a*, 513*a* and 515*a* to generate four different meta-tagged media files, each of which captures the event from a different perspective or angle.

In some cases the methods of the present invention include the use of both multiple media-file generators as well as multiple meta-tag generators, as discussed above.

G. Spectator Tagging

Aspects of the present invention make it possible for spectators attending an event (e.g., a sporting event) to generate their own unique meta-tags corresponding to features of the event that may be of particular interest to them. For example, friends or family members of a player participating in a sporting event may wish to tag particular features of the event highlighting participation by that particular player.

In one embodiment, a spectator of an event may download a tagging application for use on his or her mobile device (e.g., smartphone, tablet computer, or the like). The tagging application may, in some embodiments, allow the spectator to select a tagging profile like that discussed above in connection with FIG. 2A, and/or to create unique tags customized to the spectator's particular objectives (e.g., a tag associated with a particular player's name or uniform number). In some cases, the tagging application may permit the spectator to generate meta-tags using the touchscreen of their device, which may, in some cases, feature a tag matrix like that discussed above and illustrated in FIG. 2A (see 211).

Figure 6:
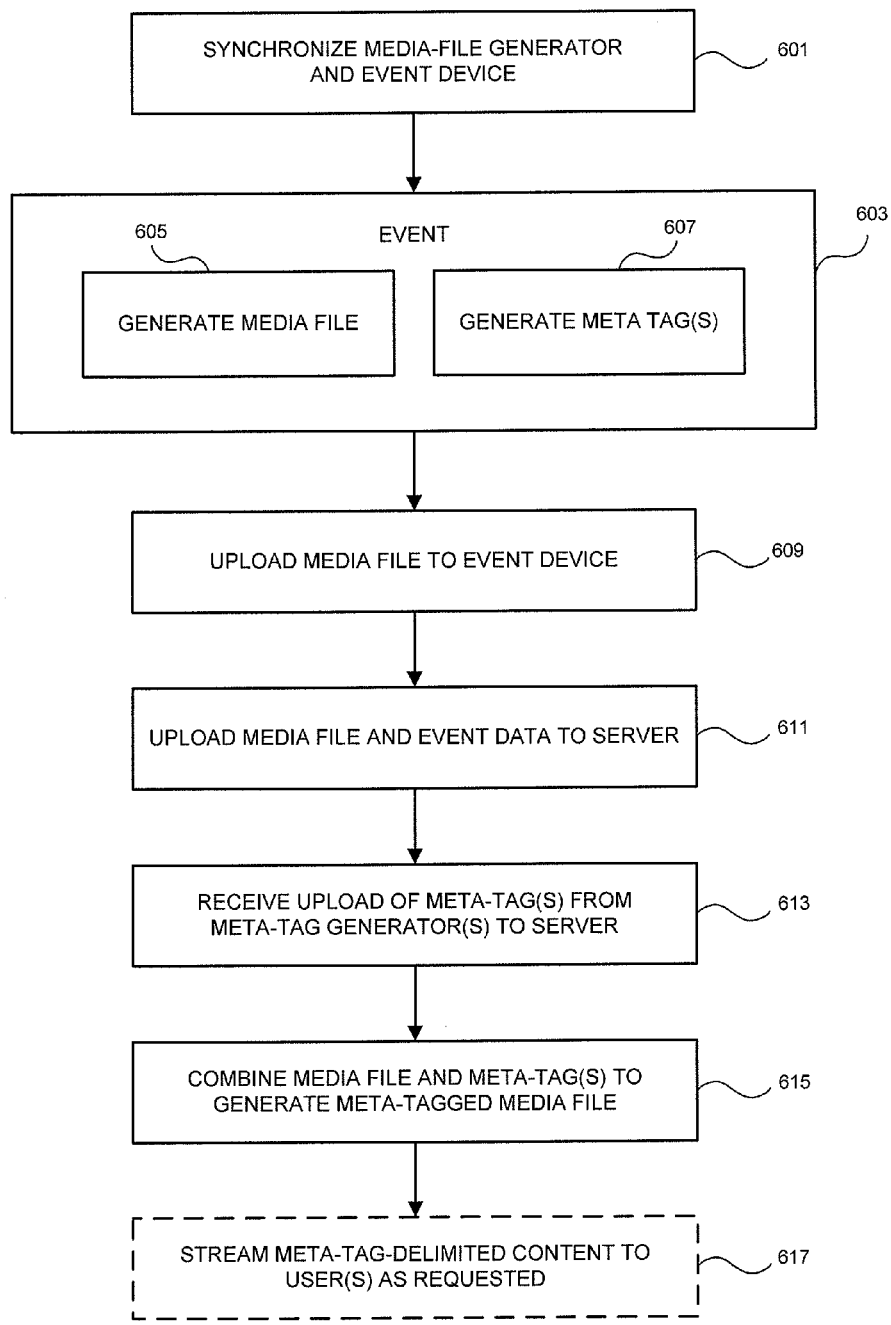
FIG. 6 is a flow diagram illustrating another exemplary flow of events in a process for generating a meta-tagged media file, and optionally streaming meta-tag-delimited content to users in accordance with an embodiment of the present invention.

With reference now to FIG. 6, there is illustrated a flow diagram of another embodiment of a method for generating a meta-tagged media file in accordance with the teachings of the present invention. In the illustrated embodiment, the method comprises, (a) synchronizing a media-file generator and the event device 601, (b) simultaneously and independently generating a media file 605 and meta-tags 607 during a live event 603, (c) uploading the media file to the event device 609, (d) uploading the media file and, optionally, event data to a server 611, (e) receiving an upload of one or more meta-tags from one or more meta-tag generators 613, (f) combining the media file and the meta-tags to generate a meta-tagged media file, and (g), optionally streaming the meta-tag delimited content to users via a network upon request. In one embodiment, the method further comprises entering event data into the event device, as discussed above in connection with FIG. 1. In a preferred embodiment of the method illustrated in FIG. 6, the media-file generator is a digital camcorder that is used to record video of a live event (e.g., a sporting event), the event device is a laptop computer, and the meta-tag generator(s) are mobile devices (e.g., smart phones or tablet computers) executing a tagging application, as discussed above, to generate meta-tags corresponding to features of the event. In some cases, the event device may also be used to generate meta-tags, which are uploaded to the server along with the media file and the optional event data.

Figure 7A:
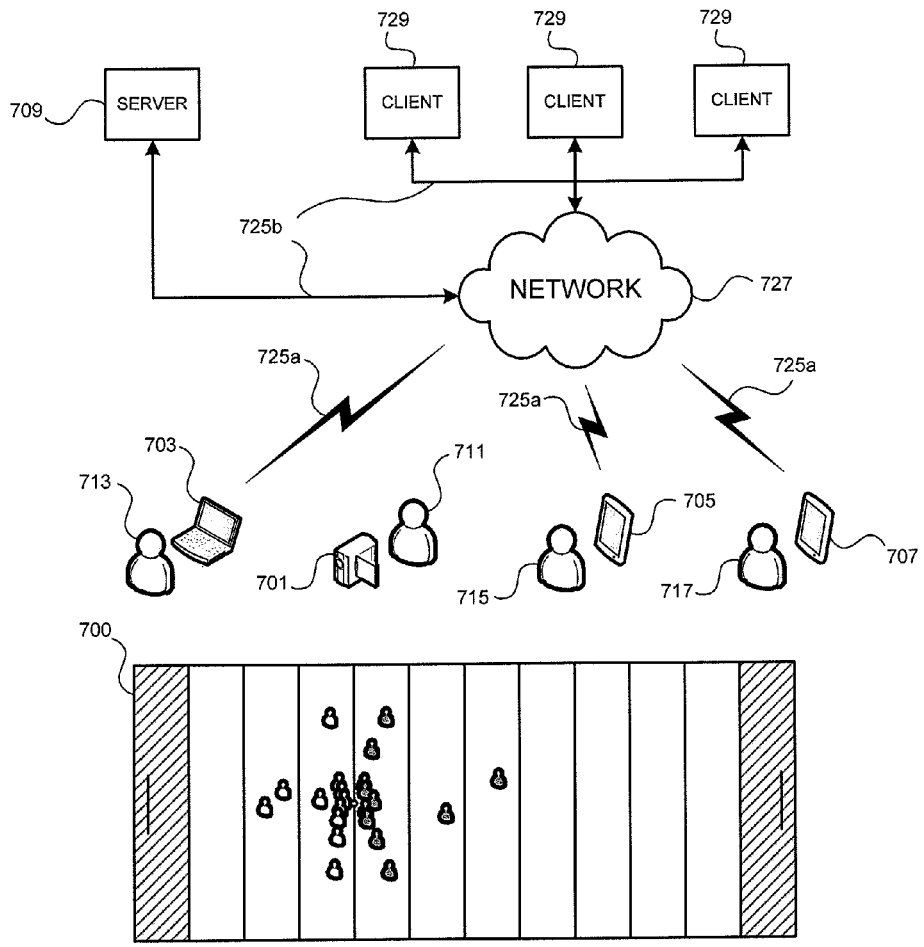
FIG. 7A is an illustration showing an exemplary event (e.g., a football game) at which a media file (e.g., a video) of the event and meta-tags corresponding to features of the event are independently and simultaneously generated and uploaded to a server in accordance with an embodiment of the invention.
Figure 7B:
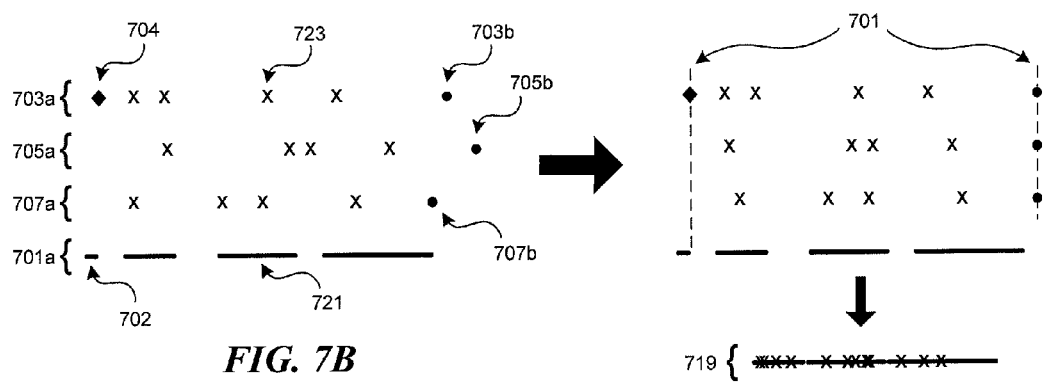
FIG. 7B is an illustration showing how several sets of meta-tags from different meta-tag generators can be correlated to a media file to generate a meta-tagged media file in accordance with an embodiment of the invention.

With reference now primarily to FIGS. 7A and 7B, there is illustrated an exemplary event (e.g., a football game) 700 at which a media file (e.g. a video) 701*a* of the event and several sets of meta-tags 703*a*, 705*a* and 707*a* corresponding to features of the event are independently and simultaneously generated and uploaded to a server 709, as well as an illustration showing the correlation of the several sets of meta-tags from different meta-tag generators 703, 705 and 707 with the single media file 701*a* to generate a meta-tagged media file 719 in accordance with an embodiment of the invention. In the illustrated embodiment shown in FIG. 7A, a videographer 711 records segments 721 of an event 700 using a digital camcorder 701 to generate a media file 701*a*. Independently and simultaneously, users 713, 715 and 717 generate sets of meta-tags 703*a*, 705*a* and 707*a* using a laptop computer 703 and two mobile devices 705 and 707, respectively. As discussed above, each individual meta-tag 723 corresponds to a feature of the event.

Upon completion of the event, the media file 701*a*, which, in one embodiment, includes a sync-clip 702 may be uploaded to the event device (e.g., the laptop computer 703) as discussed previously. In one embodiment, the event device (e.g., the laptop computer 703) has a stored sync-tag 704 that has a time-stamp corresponding to the time-stamp associated with the end of the sync-clip (which may have been generated as discussed above in connection with FIG. 2A). In one embodiment, the media file 701*a*, and the meta-tag set 703*a* from the event device are uploaded to a server 709 via communication links 725*a* and 725*b*, and a network 727, and the current time of the event device is communicated to the server to provide a correlation 703*b* between the event device time and the server's internal time. Similarly, the meta-tag sets 705*a* and 707*a* from the other meta-tag generators (e.g., the mobile devices 705 and 707) are communicated to the server 709 via communication links 725*a* and 725*b* and the network 727, along with the current time of each of the mobile devices 705 and 707. These current device times provide a correlation 705*b* and 707*b* between the mobile devices and the server's internal time. The communication links 725*a* and 725*b* may be wireless or wired links as would be familiar to one of skill in the art.

Using the server's internal time correlation corresponding to each of the meta-tag sets (or the event data and/or media file upload from the event device), and the correlation between the sync-clip and the sync-tag, each of the meta-tag sets and the media file can be "aligned" (as illustrated at 731) such that each of the meta-tags corresponds to the appropriate portion of the media file and the meta-tagged media file 719 can be generated.

In some embodiments, the meta-tagged media file 719 can then be streamed to viewers from the server 709 at one or more client devices 729 via communication links 725*b*, which may be wireless or wired links.

In some cases, users can generate their own unique meta-tagged media files by uploading their meta-tag set (and corresponding device time), which is then combined with the independently generated media-file to produce a user-specific meta-tagged media file. This allows, for example, a fan or family member of a particular player to create a meta-tagged media file containing only those meta-tags (which may have been player specific) that were generated by the fan or family member. In some cases, this may be a recruiting video.

IV. Archiving, Searching and Viewing Tagged Media Files

Meta-tagged media files produced in accordance with the methods of the present invention can be archived, searched and viewed based on, e.g., the content of the meta-tags associated with the media file. In a preferred embodiment, the media files can be searched and viewed via a web site that user's access via the internet. In one embodiment, users access the web site via a particular URL, and enter a user name and password to gain access to the web site. In some cases, different features of the web site may be available to different users based on, for example, the users' particular profile and relationship to, e.g., specific teams, players, schools, or the like.

Figure 8A:
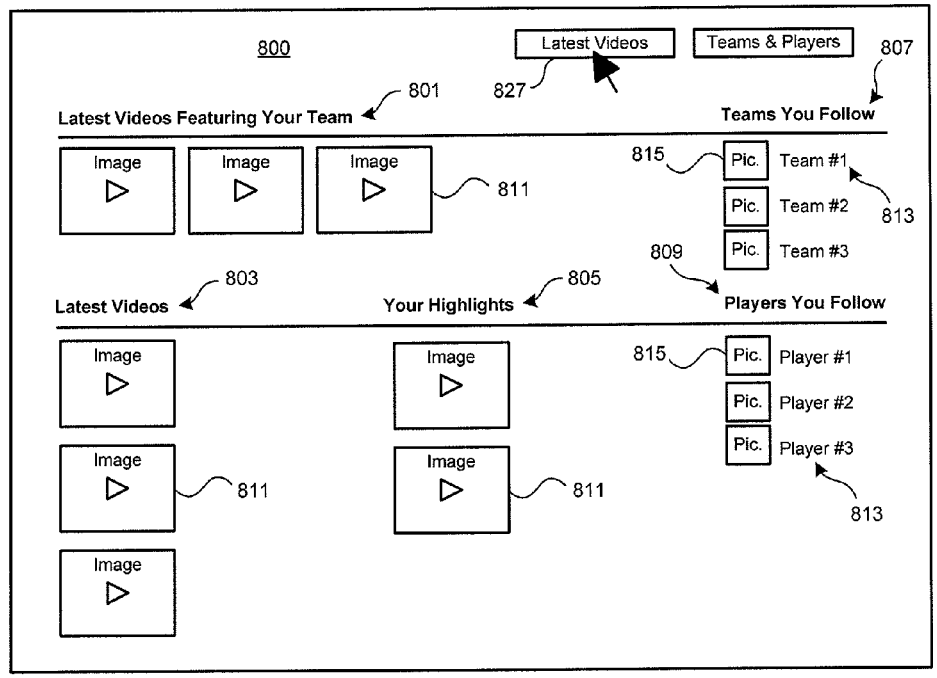
FIGS. 8A and 8B are illustrations of an exemplary graphical user interface for use in searching for, and viewing/listening to, media files in accordance with an embodiment of the invention. The illustrated graphical user interface may, for example, display pages from a web site.
Figure 8B:
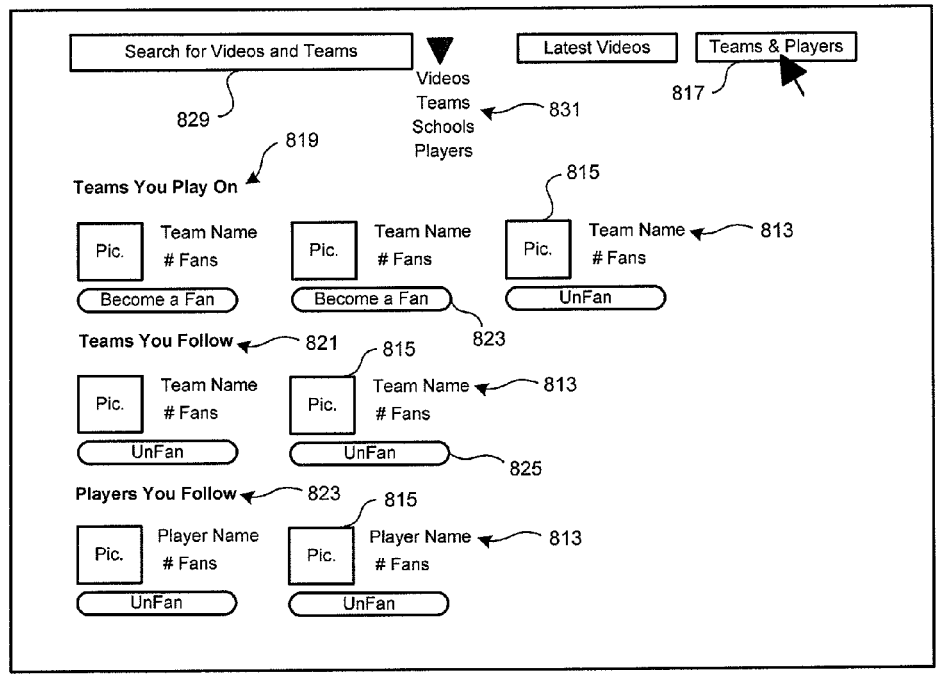

With reference now primarily to FIGS. 8A and 8B there is illustrated an exemplary view of a web page that may be accessible by a user in accordance with the present invention. In the illustrated embodiment, a user accesses a web page 800 with, e.g., a particular user name and password. In some cases, the web page is user-specific, e.g., it identifies videos associated with the user's team 801 (e.g., one or more teams on which the user participates as a player, or teams selected by the user), the latest videos of interest to the user 803 (based on, e.g., the user's preferences), highlight videos of the user 805, teams the user follows 807, and/or players the user follows 809. As will be appreciated, the web page may display thumbnail images of videos 811, which link to the particular video, such that if the user clicks on the thumbnail image, the video plays in a window opened within, e.g., the user's browser. Names 813 and/or pictures 815 of teams and/or players may also be displayed. In some cases, a user may select a team or player by clicking the picture or name of the team or player, and may be directed to another web page specific to that team, player, or the like, as discussed further below.

In one embodiment, a user may select a "Teams & Players" tab 817 to navigate to another web page that displays, e.g., teams on which the user plays 819, teams the user follows 821, and/or players the user follows 823. As discussed above, the teams and/or players may be identified with a picture 815 and/or by name 813. In some cases, the user may edit his or her selections by "Becoming a Fan" or a team or player, or discontinuing the following of a particular team or player ("UnFan"). In one embodiment, the user makes the change by selecting a "Become a Fan" button 823 or an "UnFan" button 825, which edits the user's profile. In one embodiment, the user may navigate his or her way back to the prior latest videos web page by selecting a "Latest Videos" tab 827.

In some cases, the web page(s) also include a search function, e.g., a field 829 in which the user can enter search terms, for example, the name of a school, the name of a team, the name of a player, or particular terms associated with a video (e.g., School A vs. School B). In some cases, the user may select a filter from a drop-down menu 831 to limit the user's search query to particular information (e.g., schools, teams, players, videos, or the like) stored in a database. A search may bring up a list of schools, teams, players, etc. with names, pictures, videos, as discussed above, which the user may then select to be directed to a further web page specific to that particular school, team, player, or the like, as illustrated in, e.g., FIG. 9.

Figure 9:
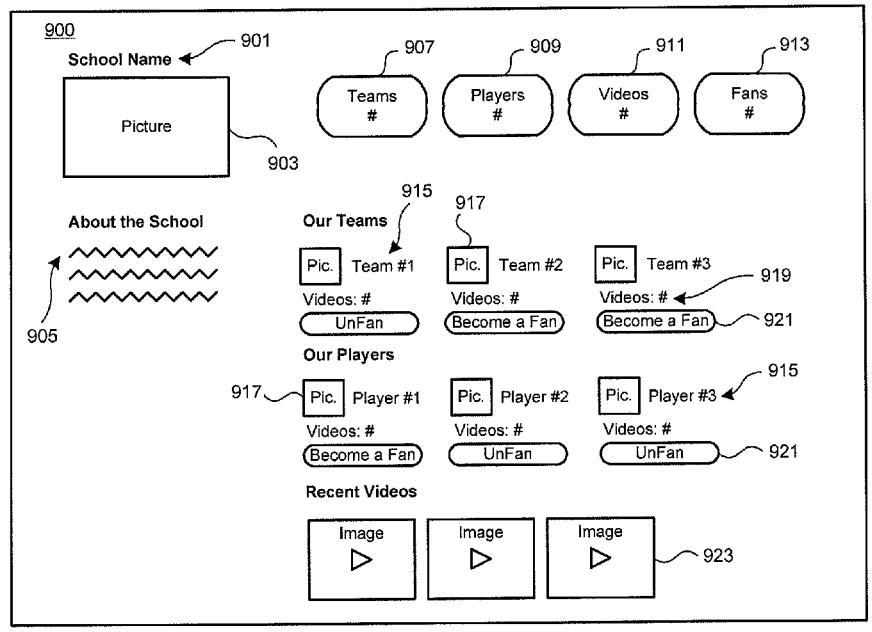
FIG. 9 is an illustration of a graphical user interface showing an exemplary web page corresponding to a particular school ("School Name"), and the teams, players, and videos associated with that school in accordance with an embodiment of the invention.

With reference now primarily to FIG. 9, there is illustrated an exemplary view of a web page 900 specific to a particular school. As will be appreciated, similar pages specific to particular sports, leagues, teams, players, or the like may also be available. In the illustrated embodiment of FIG. 9, the school is identified by name 901 along with a picture 903. In some cases, descriptive information 905 about the school, e.g., its location, mascot, enrollment, etc., may also be provided. In some cases, the number of teams 907, the number of players 909, the number of videos 911, and the number of fans 913 associated with the school may also be identified on the web page. In some cases, the teams and/or players of the school may be identified by name 915 and/or with a picture 917, as discussed above, along with a link 919 to a number of videos associated with the team or player. In some cases, the user may select the name or picture associated with a team or player and be taken to yet a further web page specific to that team or player. The further web page is, in some cases, similar to that illustrated in FIG. 9, and may also include the identification of players, coaches, schedules and results, etc. for teams, and statistics and/or accomplishments of individual players, along with videos (e.g., thumbnail images that link to videos) specific to the team and/or player.

In some cases, the media files (e.g., videos) that are available to a user for watching/listening may depend upon the user's association with the school, team, player, etc. For example, fans of a particular team may have access to media files that other users do not, or players and coaches on a particular team may have access to media files that fans or other users do not. The web page may also provide the user with a button 921 to "Fan" or "UnFan" particular teams or players, as discussed above, to permit the user to follow those teams or players with, e.g., alerts (e.g., e-mail or text message alerts) when new videos of the team or player are posted to the site. In some cases, the web page also includes thumbnail images 923 of recent videos that the user may select to view the videos.

In some cases, permissions for particular access can be established by administrators (e.g., coaches of a team). In one embodiment, a coach may grant access to team videos to an opposing coach to facilitate "exchange of game videos" before an upcoming game between two teams. In one embodiment, an administrator may distinguish between "private" and "public" media files, and grant access to all media files for team members (e.g., coaches and players), but limit access by "fans" to only "public" media files.

Figure 10:
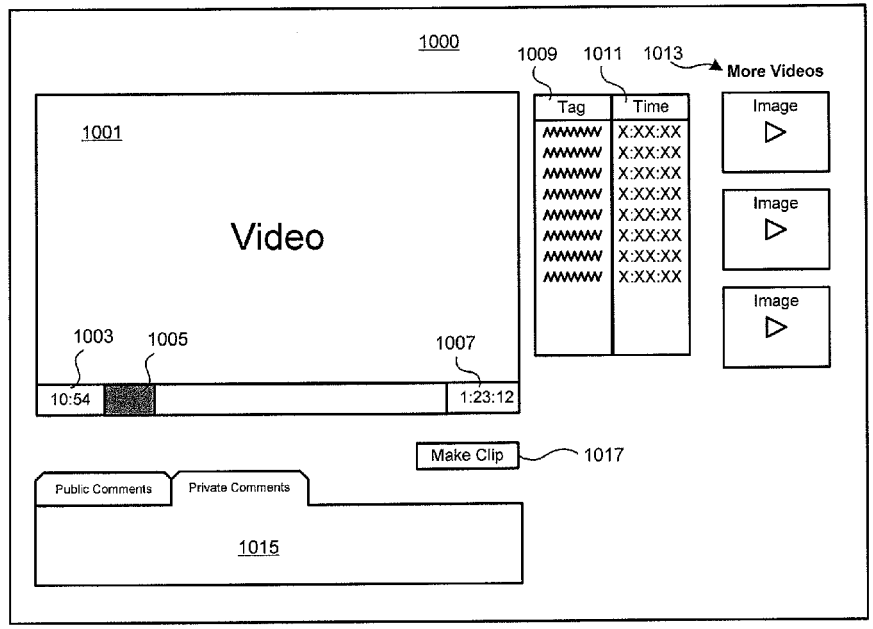
FIG. 10 is an illustration of a graphical user interface showing how a user may view a meta-tagged video and generate a highlight clip in accordance with an embodiment of the invention.

With reference now primarily to FIG. 10, there is illustrated an exemplary view of a web page 1000 that a user may be directed to when selecting a thumbnail image of a video from any one of, e.g., the web pages discussed above. In the illustrated embodiment, the video linked to the selected thumbnail is played in a window 1001 that shows, e.g., the current time 1003 within the video, a video status bar 1005 and the total time 1007 of the selected video. The view also shows a list of tags 1009 associated with the video and their corresponding times 1011 within the video being displayed in the window 1001. In one embodiment, a user may select a particular tag from the list, which will begin playback of the video from the time corresponding to the tag. In the view illustrated in FIG. 10, additional thumbnails of videos 1013 (e.g., related to the same team or player) may also be displayed.

In some cases, a user may be able to view and/or insert comments in a dialog box 1015 (which may be categorized as "public" or "private" with varying access, as discussed above) associated with the video.

In one embodiment, a user can also make a highlight clip from the video being viewed. For example, the user may click on a button 1017 (e.g., "Make Clip"), which may bring up a dialog box with fields to enter the start time of the desired clip within the current video, a field to name the clip, and a field to enter an optional description of the clip. After entering this information, the user may click another button to complete the process, and a clip beginning at the user-specified time, and with an either user-defined or pre-defined duration (e.g., 5, 10, 15, 20, 25, 30, 35, 40, 45, 50, or 55 seconds, or 1, 2, 3 or more minutes), preferably 30 seconds, is generated by extracting a copy of that portion of the video specified by the user. As will be appreciated, the highlight clip may correspond to a scoring play or other feature of an event that the user wishes to separately capture. In one embodiment, the newly created highlight clip may be displayed among the user's list of recent highlight clips 805 (see FIG. 8A).

All references cited herein, including patents, patent applications, and publications, are hereby incorporated by reference in their entireties, whether previously specifically incorporated or not. The publications mentioned herein are cited for the purpose of describing and disclosing methodologies and concepts that may be used in connection with the present invention. Nothing herein is to be construed as an admission that these references are prior art in relation to the inventions described herein.

Although this invention has been described in connection with specific embodiments thereof, it will be understood that it is capable of further modifications. This application is intended to cover any variations, uses, or adaptations of the invention following, in general, the principles of the invention and including such departures from the present disclosure as come within known or customary practice within the art to which the invention pertains and as may be applied to the essential features hereinbefore set forth.

What is claimed is:

1. A method for producing a meta-tagged media file, the method comprising:
    correlating a device time of a media-file generator with a device time of a meta-tag generator, wherein the media-file generator is separate from the meta-tag generator, wherein correlating the device time of the media-file generator with the device time of the meta-tag generator includes synchronizing the media-file generator and the meta-tag generator, and wherein synchronizing the media-file generator and the meta-tag generator includes:
        generating a sync-tag with the meta-tag generator that coincides with providing a prompt to initiate a beginning and an ending of a recordation of a sync-clip;
        beginning recordation of the sync-clip on the media-file generator;
        ending recordation of the sync-clip on the media-file generator; and
        correlating timing of the beginning and ending of the sync-clip with the generation of the sync-tag by the meta-tag generator, the correlating timing including comparing the device time of the media-file generator corresponding to the recordation of the sync-clip with the device time of the meta-tag generator corresponding to the generation of the sync-tag;
    recording an event to produce a media file in the media-file generator;
    independently and simultaneously with the production of at least a portion of the media file in the media-file generator, generating at least one meta-tag with the meta-tag generator, wherein the meta-tag corresponds to a feature of the event; and
    combining the media file and the at least one meta-tag to produce the meta-tagged media file based on the correlated timing of the device time of the media-file generator and the device time of the meta-tag generator as correlated using the sync-tag and the sync-clip, wherein the meta-tag is associated with the feature of the event recorded in the media file and synchronized with the sync-tag based on the correlated timing of the device time of the media-file generator and the device time of the meta-tag generator.

2. The method of claim 1, wherein the synchronizing occurs prior to recording the event.

3. The method of claim 1, wherein the media file is a video file.

4. The method of claim 1, wherein the media-file generator is of a type from the group consisting of: a digital camcorder, a computer, a laptop computer, a mobile device, a tablet computer, and a smart phone.

5. The method of claim 1, wherein the media-file generator comprises two or more media-file generators.

6. The method of claim 1, wherein the meta-tag generator comprises two or more meta-tag generators.

7. The method of claim 1, wherein the meta-tag generator is selected from the group consisting of a computer, a laptop computer, a mobile device, a tablet computer, and a smart phone.

8. The method of claim 1, wherein the media file is stored on a storage device in the media-file generator.

9. The method of claim 8, wherein the storage device is a machine readable storage medium.

10. The method of claim 1, wherein the event is a live event of a type from the group consisting of: a sporting event, a presentation, a demonstration, a performance, a speech, and a lecture.

11. The method of claim 10, wherein the sporting event is selected from the group consisting of a football game, a basketball game, a golf tournament, a tennis match, a water polo match, a volleyball game, a soccer game, a baseball game, a softball game, a gymnastics meet, a wrestling meet, a track meet, a cross-country meet, a lacrosse game, a hockey game, a field hockey game, a roller hockey game, a badminton match, and a rugby match.

12. A system for producing a meta-tagged media file, the system comprising:
    a media-file generator;
    a meta-tag generator being separate from the media-file generator; and
    processing logic to correlate a device time of the media-file generator with a device time of the meta-tag generator, wherein correlating the device time of the media-file generator with the device time of the meta-tag generator includes synchronizing the media-file generator and the meta-tag generator, and wherein synchronizing the media-file generator and the meta-tag generator includes:
        generating a sync-tag with the meta-tag generator that coincides with providing a prompt to initiate a beginning and an ending of a recordation of a sync-clip;
        beginning recordation of the sync-clip on the media-file generator;
        ending recordation of the sync-clip on the media-file generator; and
        correlating timing of the beginning and ending of the sync-clip with the generation of the sync-tag by the meta-tag generator, the correlating timing including comparing the device time of the media-file generator corresponding to the recordation of the sync-clip with the device time of the meta-tag generator corresponding to the generation of the sync-tag;

the system being further configured to record an event to produce a media file in the media-file generator; independently and simultaneously with the production of at least a portion of the media file in the media-file generator, generate at least one meta-tag with the meta-tag generator, wherein the meta-tag corresponds to a feature of the event; and combine the media file and the at least one meta-tag to produce the meta-tagged media file based on the correlated timing of the device time of the media-file generator and the device time of the meta-tag generator as correlated using the sync-tag and the sync-clip, wherein the meta-tag is associated with the feature of the event recorded in the media file and synchronized with the sync-tag based on the correlated timing of the device time of the media-file generator and the device time of the meta-tag generator.

13. The system of claim 12, wherein the synchronizing occurs prior to recording the event.

14. The system of claim 12, wherein the media file is a video file.

15. The system of claim 12, wherein the media-file generator is of a type from the group consisting of: a digital camcorder, a computer, a laptop computer, a mobile device, a tablet computer, and a smart phone.

16. The system of claim 12, wherein the media-file generator comprises two or more media-file generators.

17. The system of claim 12, wherein the meta-tag generator comprises two or more meta-tag generators.

18. The system of claim 12, wherein the meta-tag generator is selected from the group consisting of a computer, a laptop computer, a mobile device, a tablet computer, and a smart phone.

19. The system of claim 12, wherein the media file is stored on a storage device in the media-file generator.

20. The system of claim 19, wherein the storage device is a machine readable storage medium.

21. The system of claim 12, wherein the event is a live event of a type from the group consisting of: a sporting event, a presentation, a demonstration, a performance, a speech, and a lecture.

22. The system of claim 21, wherein the sporting event is selected from the group consisting of a football game, a basketball game, a golf tournament, a tennis match, a water polo match, a volleyball game, a soccer game, a baseball game, a softball game, a gymnastics meet, a wrestling meet, a track meet, a cross-country meet, a lacrosse game, a hockey game, a field hockey game, a roller hockey game, a badminton match, and a rugby match.

23. A non-transitory machine-useable storage medium embodying instructions which, when executed by a machine, cause the machine to:

correlate a device time of a media-file generator with a device time of a meta-tag generator, wherein the media-file generator is separate from the meta-tag generator, wherein correlating device time of the media-file generator with device time of the meta-tag generator includes synchronizing the media-file generator and the meta-tag generator, and wherein synchronizing the media-file generator and the meta-tag generator includes:

generating a sync-tag with the meta-tag generator that coincides with providing a prompt to initiate a beginning and an ending of a recordation of a sync-clip;

beginning recordation of the sync-clip on the media-file generator;

ending recordation of the sync-clip on the media-file generator; and correlating timing of the beginning and ending of the sync-clip with the generation of the sync-tag by the meta-tag generator, the correlating timing including comparing the device time of the media-file generator corresponding to the recordation of the sync-clip with the device time of the meta-tag generator corresponding to the generation of the sync-tag;

record an event to produce a media file in the media-file generator;

independently and simultaneously with the production of at least a portion of the media file in the media-file generator, generate at least one meta-tag with the meta-tag generator, wherein the meta-tag corresponds to a feature of the event; and combine the media file and the at least one meta-tag to produce the meta-tagged media file based on the correlated timing of the device time of the media-file generator and the device time of the meta-tag generator as correlated using the sync-tag and the sync-clip, wherein the meta-tag is associated with the feature of the event recorded in the media file and synchronized with the sync-tag based on the correlated timing of the device time of the media-file generator and the device time of the meta-tag generator.

24. The non-transitory machine-useable storage medium of claim 23, wherein the synchronizing occurs prior to recording the event.

25. The non-transitory machine-useable storage medium of claim 23, wherein the media file is a video file.

26. The non-transitory machine-useable storage medium of claim 23, wherein the media-file generator is of a type from the group consisting of: a digital camcorder, a computer, a laptop computer, a mobile device, a tablet computer, and a smart phone.

27. The non-transitory machine-useable storage medium of claim 23, wherein the media-file generator comprises two or more media-file generators.

28. The non-transitory machine-useable storage medium of claim 23, wherein the meta-tag generator comprises two or more meta-tag generators.

29. The non-transitory machine-useable storage medium of claim 23, wherein the meta-tag generator is selected from the group consisting of a computer, a laptop computer, a mobile device, a tablet computer, and a smart phone.

30. The non-transitory machine-useable storage medium of claim 23, wherein the media file is stored on a storage device in the media-file generator.

31. The non-transitory machine-useable storage medium of claim 30, wherein the storage device is a machine readable storage medium.

32. The non-transitory machine-useable storage medium of claim 23, wherein the event is a live event of a type from the group consisting of: a sporting event, a presentation, a demonstration, a performance, a speech, and a lecture.

33. The non-transitory machine-useable storage medium of claim 32, wherein the sporting event is selected from the group consisting of a football game, a basketball game, a golf tournament, a tennis match, a water polo match, a volleyball game, a soccer game, a baseball game, a softball game, a gymnastics meet, a wrestling meet, a track meet, a cross-country meet, a lacrosse game, a hockey game, a field hockey game, a roller hockey game, a badminton match, and a rugby match.

* * * * *